United States Patent
Kikuchi (10) Patent No.: US 8,006,294 B2
(45) Date of Patent: Aug. 23, 2011

(54) SYSTEM AND METHOD FOR SINGLE SIGN-ON

(75) Inventor: Katsuro Kikuchi, Musashino (JP)

(73) Assignee: Hitachi, Ltd., Tokyo (JP)

( * ) Notice: Subject to any disclaimer, the term of this patent is extended or adjusted under 35 U.S.C. 154(b) by 1064 days.

(21) Appl. No.: 11/440,081

(22) Filed: May 25, 2006

(65) Prior Publication Data

US 2006/0271689 A1    Nov. 30, 2006

(30) Foreign Application Priority Data

May 26, 2005  (JP) ................. 2005-153261

(51) Int. Cl.
*G06F 7/04*     (2006.01)
(52) U.S. Cl. ............. 726/8; 726/18; 726/28; 713/155; 713/168; 713/184; 709/219; 709/225
(58) Field of Classification Search ............. 726/8
See application file for complete search history.

(56) References Cited

U.S. PATENT DOCUMENTS

| | | | |
|---|---|---|---|
| 7,412,720 B1 * | 8/2008 | Frey et al. ............. | 726/8 |
| 7,496,953 B2 * | 2/2009 | Andreev et al. ......... | 726/8 |
| 2003/0200465 A1 * | 10/2003 | Bhat et al. ............. | 713/202 |

FOREIGN PATENT DOCUMENTS

| | | |
|---|---|---|
| JP | 2002-032340 | 1/2002 |
| JP | 2002-041380 | 2/2002 |
| JP | 2002-334056 | 11/2002 |
| JP | 2003-058503 | 2/2003 |
| JP | 2003-141081 | 5/2003 |
| JP | 2005-321970 | 11/2005 |

OTHER PUBLICATIONS

"X/Open Single Sign-on Service (XSSO)-Pluggable Authentication Modules" 1997, pp. 1-15.*

* cited by examiner

*Primary Examiner* — Eleni A Shiferaw
*Assistant Examiner* — Shewaye Gelagay
(74) *Attorney, Agent, or Firm* — Mattingly & Malur, PC (57) ABSTRACT

The single sign-on is implemented without requiring knowledge of a lower layer such as HTTP and HTML by using a single sign-on module which stores knowledge to store single sign-on and a single sign-on server which analyzes log-in communication of an EIS (Enterprise Information System) and selects and executes an applicable single sign-on module. Since the single sign-on can be implemented without requiring knowledge of a lower layer such as HTTP and HTML from a system engineer, the single sign-on can be implemented in a short period and at low cost.

4 Claims, 10 Drawing Sheets

```
<html> <head> <title>sso</title> </head>
<body onload="f.submit()">
   <form id="f" method="POST" action="http://backend1/app/login.jsp">
     <input type="hidden" name="id" value="taro">
     <input type="hidden" name="passwd" value="xyz">
   </form>
</body> </html>
```
— 700

```
POST http://backend1/app/login.jsp HTTP/1.0
Content-Type:application/x-www-form-uriencoded
Content-Length:30 id=bk1u0001
passwd=bk1pass0001
```
— 701

SYSTEM AND METHOD FOR SINGLE SIGN-ON

INCORPORATION BY REFERENCE

The present application claims priority from Japanese application JP2005-153261 filed on May 26, 2005, the content of which is hereby incorporated by reference into this application.

BACKGROUND OF THE INVENTION

The present invention relates to a system architecture and a processing mechanism for automatically logging in to a web application.

The enterprise information system (EIS) is proceeding from the traditional client server system to the three-tier system based on the web (world wide web) technology. Until now, various businesses are implemented as web applications to improve the business efficiency. On the other hand, as a result, a large number of EISs are present respectively for businesses in the enterprise. The user is compelled to conduct complicated operations such as going round these systems and logging in to respective systems in order to accomplish daily business. Attention is paid to the single sign-on technology in order to solve this problem. The single sign-on is a login mechanism in which all systems are made available by only conducting login operation only once and receiving authentication when utilizing a plurality of systems which require authentication.

For implementing single sign-on to an enterprise information system (EIS), i.e., a web application, processing corresponding to an authentication mechanism or a session management mechanism of the web application becomes necessary. On the other hand, HTTP and HTML for implementing the web application have been developed originally with the object of a document publishing system. Therefore, it can be said that HTTP and HTML are insufficient in power as the execution basis of the web application. For example, HTTP which is a communication protocol does not have a session management mechanism, because HTTP is a stateless communication protocol. In addition, HTTP does not provide an authentication mechanism. Therefore, it is necessary to individually build the basic function of the web applications such as the authentication mechanism and the session management mechanism in each application. In recent years, frameworks for developing and executing a web application, such as J2EE (Java 2 Platform, Enterprise Edition) of Sun Microsystems (Java is a trademark of Sun Microsystems) and .NET Framework of Microsoft, are prepared, and the authentication mechanisms and session management mechanisms are narrowed down to some degree. However, they are not narrowed down to one. For implementing the single sign-on in the web application, therefore, it is necessary to build in a single sign-on mechanism corresponding to the authentication mechanism and the session management mechanism in the web application individually built in.

As the single sign-on implementing mechanism, various methods have been proposed in JP-A-2005-321970, JP-A-2003-141081, JP-A-2003-58503, JP-A-2002-32340, JP-A-2002-41380 and JP-A-2002-334056 so as to correspond to the authentication mechanism and the session management mechanism in the web application.

As products for implementing single sign-on, there is, for example, SiteMinder (trademark) of Netegrity Corporation.

A large number of enterprise information systems (EISs) are present for businesses in the enterprise. The user is compelled to conduct complicated operations such as going round these systems and logging in to respective systems in order to accomplish daily business. Attention is paid to the single sign-on technology in order to solve this problem.

Several products for implementing the single sign-on are also known. For applying these products, however, it is necessary to generally modify the enterprise information systems (EISs). The construction period and the construction cost for implementing the single sign-on tend to increase. In constructing an IT system, shortening of the construction period and the cost performance benefit are demanded. In these products, achievement of this demand is difficult in some cases.

Furthermore, it is also possible to implement the single sign-on by analyzing the authentication mechanism and the session management mechanism in existing enterprise information systems. A system engineer who conducts this is required to have a deep knowledge of a lower layer such as HTTP and HTML which are basic technologies of the web application besides knowledge concerning the business logic and the IT technology of the upper layer. As a result, the single sign-on implementing mechanism becomes a cluster of the know-how (implicit knowledge) of the system engineer. In implementing the single sign-on, the technological hurdle and cost become high. Furthermore, when communication is subject to encryption using a SSL (Secure Socket Layer) or the like, analysis is substantially difficult.

SUMMARY OF THE INVENTION

A single sign-on module corresponding to a specific authentication mechanism and session management mechanism according to the present invention is created previously. The single sign-on module is registered in a single sign-on server together with an applicable communication pattern. A communication log for enterprise information system login is acquired and collated with the communication pattern to select an applicable single sign-on module. Single sign-on is conducted using the selected single sign-on module. As a result, the single sign-on can be implemented without analysis of the authentication mechanism and the session management mechanism in the enterprise information system conducted by the system engineer.

According to the present invention, the single sign-on can be implemented without needing a deep knowledge of a lower layer such as HTTP and HTML which are basic technologies of the web application. As a result, a single sign-on environment can be implemented at low cost.

Other objects, features and advantages of the invention will become apparent from the following description of the embodiments of the invention taken in conjunction with the accompanying drawings.

BRIEF DESCRIPTION OF THE DRAWINGS

FIG. 1 is a system architecture diagram of an embodiment for implementing single sign-on;

DESCRIPTION OF THE EMBODIMENTS

An embodiment for implementing the single sign-on will now be described.

Figure 1:
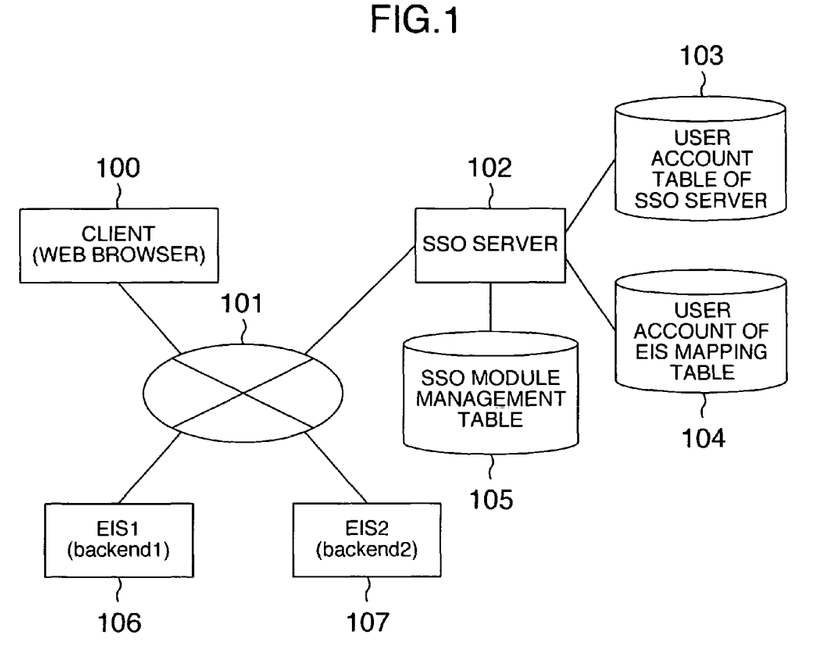

FIG. 1 shows an example of a system architecture for implementing the single sign-on. An SSO server 102 provides a client 100 with single sign-on service. The client 100 and the SSO server 102 are connected to each other via an arbitrary network system 101. The SSO server 102 manages under its control, a user account table of SSO server 103 for managing users who are provided with single sign-on service by the SSO server, a user account of EIS mapping table 104 for associating users of the SSO server with user information of an EIS which becomes a subject of single sign-on, and an SSO module management table 105 for storing single sign-on modules which implement the single sign-on. An EIS1 106 and an EIS2 107 are enterprise information systems which are subjects of the single sign-on in the present embodiment. In the present embodiment, there are two EISs. Alternatively, it is possible to provide an arbitrary number of EISs which are at least one EIS with the single sign-on service.

Figure 2:
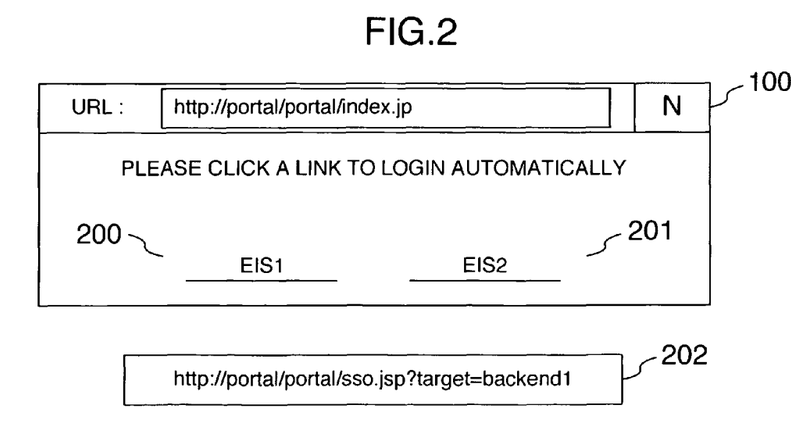
FIG. 2 shows an example of a single sign-on service screen of a single sign-on server in an embodiment.

When receiving single sign-on service, the user first logs in to the SSO server from the client 100. The SSO server 102 authenticates the user. If the authentication is successful, the SSO server 102 returns a single sign-on service screen shown in FIG. 2 to the client 100. As for basic screen configuration, links (200, 201) to single sign-on subjects are enumerated. In each link, a query or the like is embedded as indicated by 202 so as to clarify the single sign-on subject.

Figure 3:
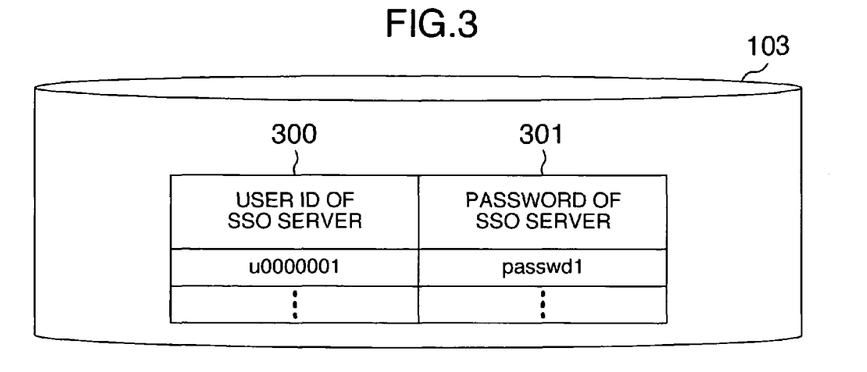
FIG. 3 is a data structure diagram of an SSO server user management table in an embodiment.
Figure 4:
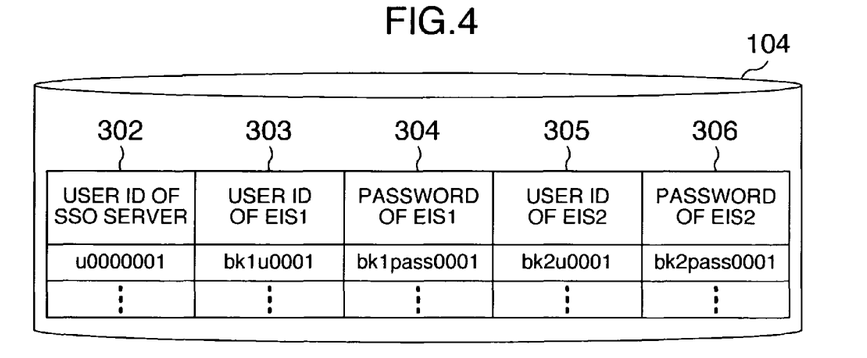
FIG. 4 is a data structure diagram of an EIS user information mapping table in an embodiment.
Figure 5:
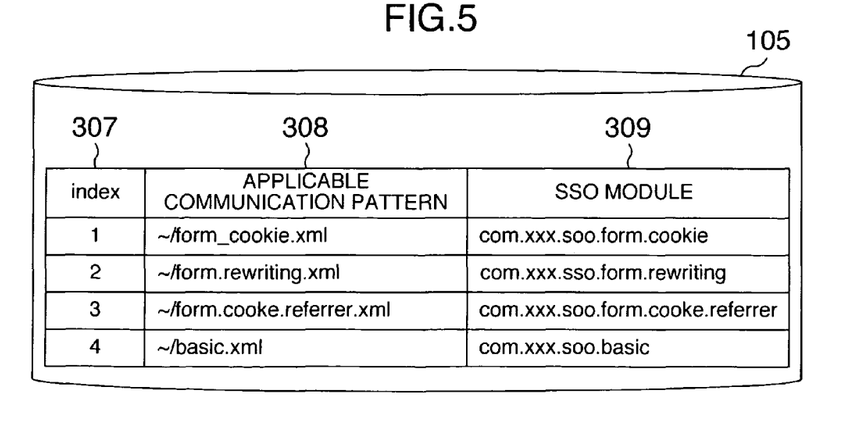
FIG. 5 is a data structure diagram of an SSO module management table in an embodiment.

Table configurations of the user account table of SSO server 103, the user account of EIS mapping table 104, and the SSO module management table 105 are shown in FIGS. 3, 4 and 5, respectively. A user ID 300 and a password 301 are stored in the user account table of SSO server 103 as information for authenticating a user who is provided with single sign-on service provided by the SSO server 102. In the present embodiment, the method using a user ID and a password typically used as the authentication method in the single sign-on service is adopted. Alternatively, a different authentication method may also be adopted. For example, client certification using an IC card can be adopted. The kind of information previously preserved in the user account table of SSO server 103 depends upon the adopted authentication method. The user account of EIS mapping table 104 is a table for linking a user of the SSO server 102 to a user of an individual EIS. For example, a user (302) having a user ID "u0000001" of the SSO server 102 corresponds to a user "bklu0001" (303) of the EIS1 and a user "bk2u0001" (305) of the EIS2. In addition, the user account of EIS mapping table 104 stores information required to log in to an EIS. In the present embodiment, both the EIS1 and the EIS2 conduct authentication by using a user ID and a password. Passwords are stored respectively for the EIS1 and the EIS2 (304, 306). In the present embodiment, the example using the user ID and the password has been shown. Alternatively, arbitrary information, such as an enterprise code or an X.509 certificate, can be stored.

Figure 6:
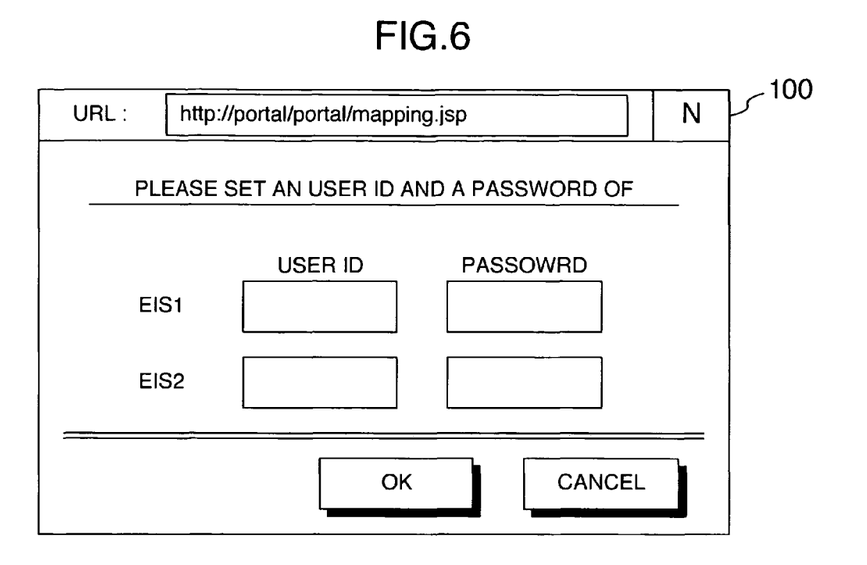
FIG. 6 shows an example of a screen for setting user IDs and passwords of EISs.

It is possible for the system manager to set the mapping information collectively, or it is possible to provide the SSO server 102 with an interface shown in FIG. 6 and cause each user to set the mapping information.

The SSO module management table 105 will now be described. A program module for actually implementing the SSO is stored in the SSO module management table 105. By the way, the implementation method of the SSO module is described in detail in JP-A-2005-321970.

Figure 8:
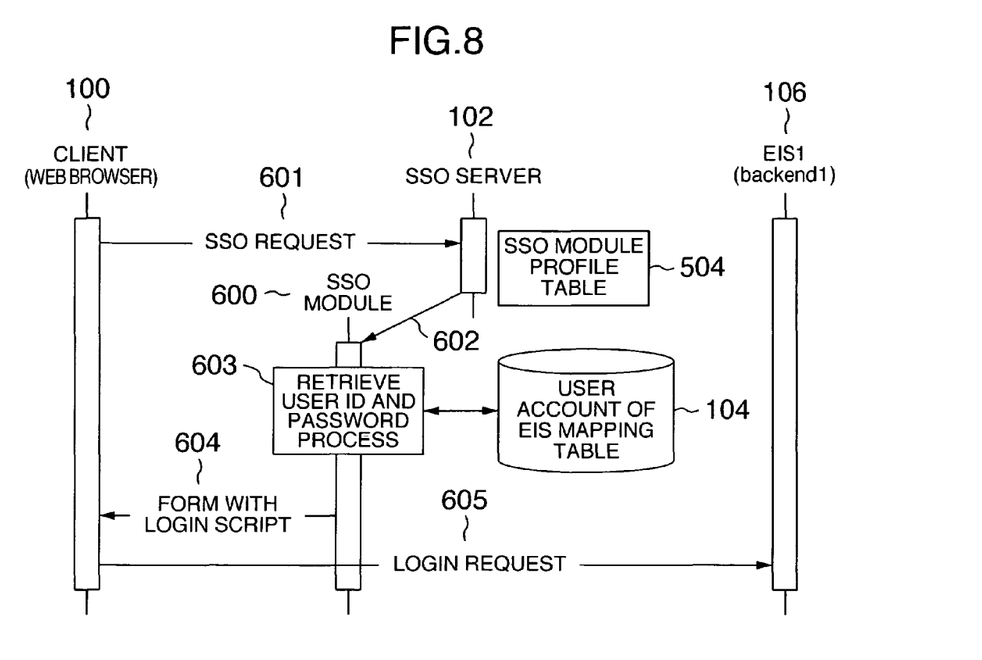
FIG. 8 shows an execution example of a single sign-on module.
Figure 9:
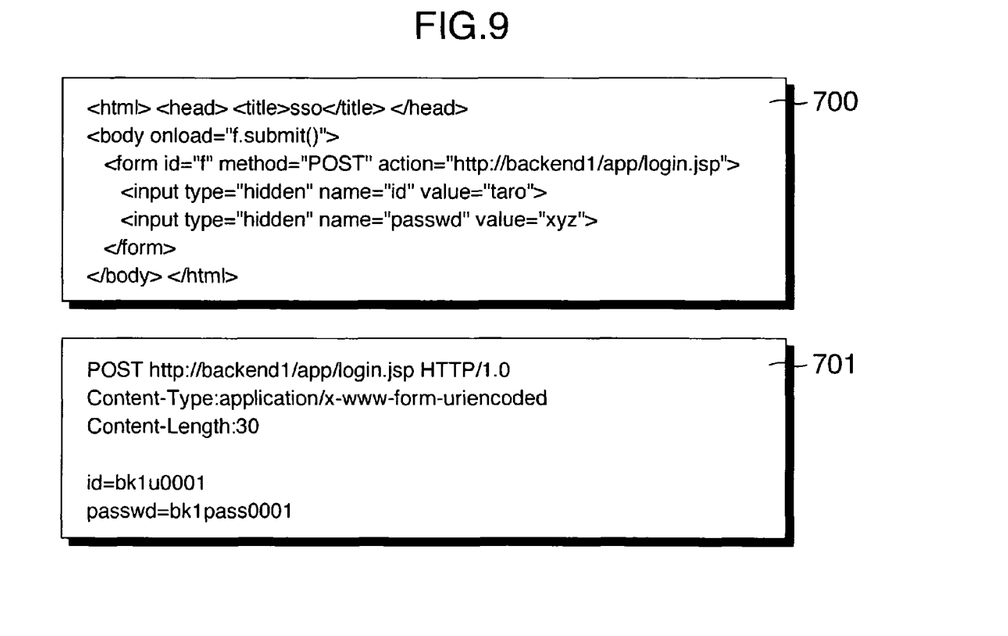
FIG. 9 shows an example of HTML and communication data used in an execution example of a single sign-on module.

Here, an example of the single sign-on module will be described with reference to FIGS. 8 and 9. The present single sign-on module is a single sign-on module in which the session tracking mechanism of the EIS can be applied to either of the cookie-based and the URL-rewriting. FIG. 8 shows a flow of processing among the client 100, the SSO server 102, and the EIS1 106. FIG. 9 shows information which flows in automatic login. Upon receiving a single sign-on request from the client 100, the SSO server 102 retrieves an SSO module corresponding to the EIS from an SSO module profile table 504, and executes the retrieved SSO module 600 (602). By the way, methods for registration and execution will be described later. The executed SSO module acquires a user ID and a password of the EIS1 106 from the user account of EIS mapping table 104 at step 603, and then returns a response HTML indicated by 700 in FIG. 9 to the client 100 (604). HTML 700 shown in FIG. 9 is obtained by conducting two modifications, "an input element is provided with a hidden attribute" and "a form is submitted when reading HTML" on HTML obtained by previously embedding a user ID and a password in a login form of EIS1 106. Upon receiving the form with login, the client 100 submits the form concurrently with completion of the HTML reading, by using an event handler script of an onload event (605). In FIG. 9, reference numeral 701 indicates a submitted request. This request becomes similar to a request submitted after the user has input a user ID and a password to a login screen. Therefore, it is possible to log in to the EIS1 106. As a result, automatic login can be implemented. An example in which single sign-on is actually conducted using the SSO module has been described heretofore.

Figure 10:
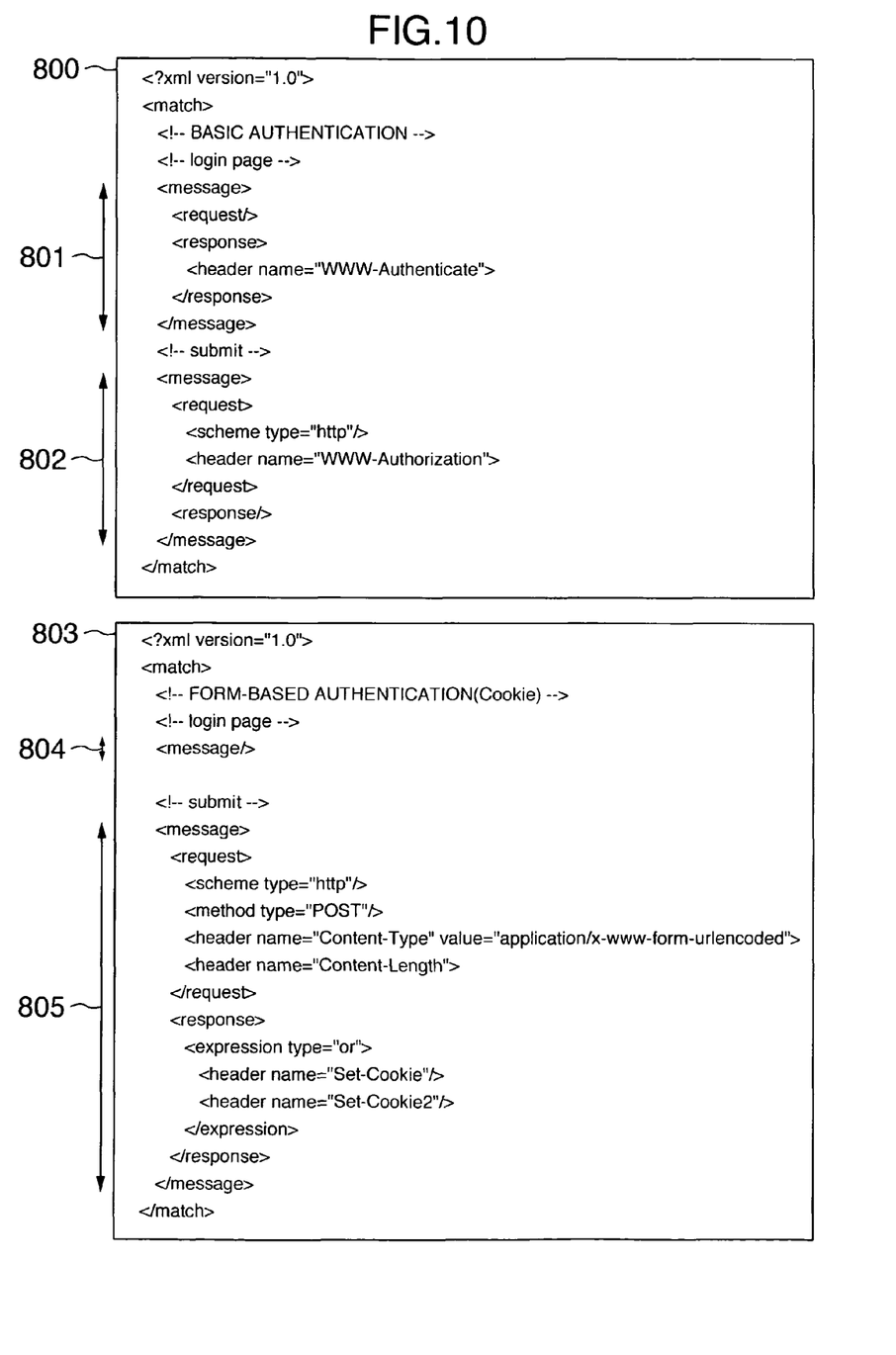
FIG. 10 shows an example of a communication pattern definition which defines a communication pattern of basic authentication and form-based authentication (cookie-based session tracking)

The SSO module management table 105 shown in FIG. 5 includes, in addition to the SSO module described above as an example, a path 308 of a file which describes communication patterns the SSO module can apply, and an index 307 for identifying the SSO module. FIG. 10 shows examples of the communication pattern. In the present example, an XML form file is used to define the communication pattern. Alternatively, an arbitrary description method may be used as long as communication patterns described below can be described. Here, basic authentication 800 and an example 803 of form-based authentication conducting cookie-based session tracking are shown. The communication pattern description includes a request and a response (801 and 804) for login screen display, and a request and a response (802 and 805) at the time of authentication information sending. Each of them is described using a message element. Each message element includes a request element indicating a request pattern and a response element indicating a response pattern. The request element includes a scheme element, a method element and a header element, so as to correspond to the request form of HTTP. The scheme element specifies "http" or "https" as a communication type. The method element mainly specifies "GET" or "POST" as an authentication information sending mechanism. The header element specifies a name attribute and a value attribute so as to correspond to a header name and value of a request header. On the other hand, the response element corresponds to a response form of HTTP. Basically, header information required in the header element is defined. By the way, an expression element is a special element, and it is used to specify a logical sum of child elements. In the example of 805, it is indicated that a "Set-Cookie" header and/or a "Set-Cookie2" header are present. By the way, information described in the pattern represents indispensable information.

Two examples shown in FIG. 10 will now be described. The basic authentication 800 indicates that "WWW-Authenticate" appears in the response header 801 used at the time of login screen display and "WWW-Authorization" appears in the request header 802 used at the time of login information sending. The login information sending is conducting using "http". If matching between a communication log described later and the present communication pattern is attained, then the single sign-on can be implemented using a single sign-on module corresponding to the present communication pattern.

The form-based authentication 803 conducting cookie-based session tracking indicates that a request and a response at the time of login screen display are not especially prescribed and the request at the time of login information sending has "http" in scheme, "POST" in method, and specifications "Content-Type: application/x-www-form-urlencoded" and "Content-Length" in the request header. If matching between a communication log described later and the present communication pattern is attained, then the single sign-on can be implemented using a single sign-on module corresponding to the present communication pattern, in the same way as the basic authentication 800.

Figure 7:
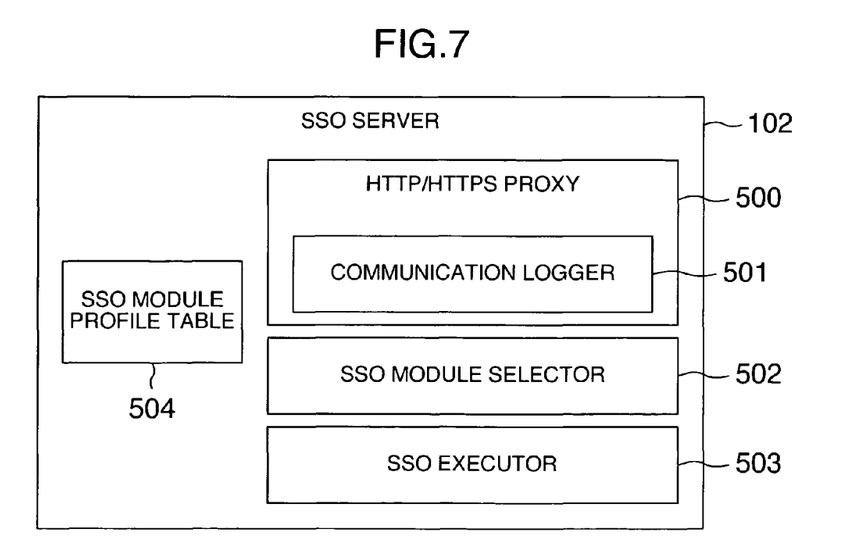
FIG. 7 is a function block diagram of a single sign-on server.

A function block of the SSO server 102 will now be described with reference to FIG. 7. The SSO server 102 includes an HTTP/HTTPS proxy 500, a communication logger 501, an SSO module selector 502, an SSO executor 503 and an SSO module profile table 504.

In the HTTP/HTTPS proxy 500 and the communication logger 501, HTTP/HTTPS conducts operation like an ordinary proxy server, and acquires a communication log of operation of login to the EIS. In the case of HTTPS, a communication log of an HTTP level is acquired by conducting HTTP communication between the client 100 and the SSO server 102 and HTTPS communication between the SSO server 102 and the EIS. The SSO module profile table 504 includes a combination of an ID for identifying a web application and an SSO module ID.

Figure 11:
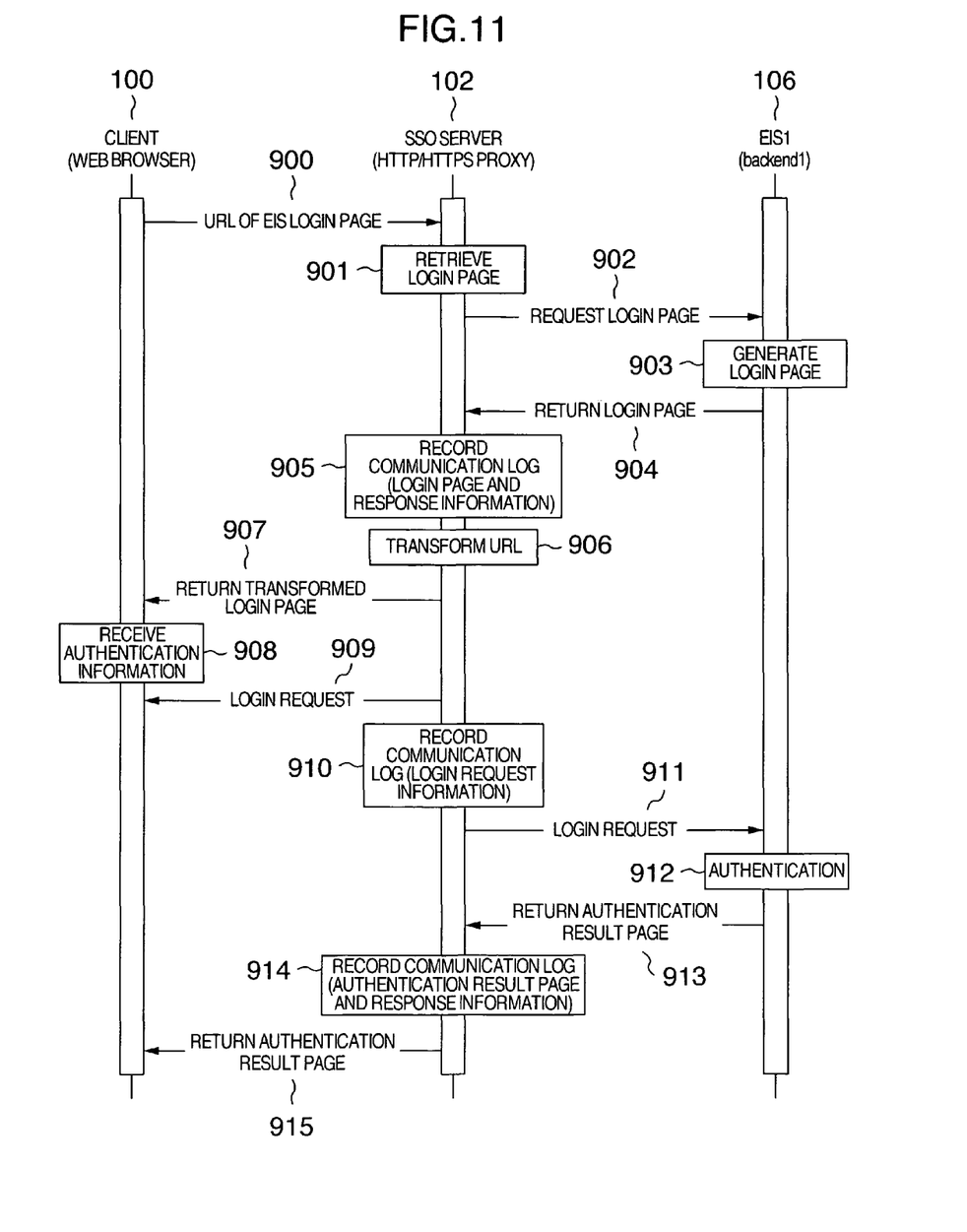
FIG. 11 shows an operation example of an HTTP/HTTPS proxy and a communication log acquisition example.

FIG. 11 shows an operation example of the SSO server 120. The single sign-on service includes two steps. A first step is an initialization step. At the first step, analysis of a login mechanism of the EIS and selection of an SSO module are conducted. A second step is a step of being provided with single sign-on service. At the second step, single sign-on service is provided using the SSO module selected at the first step.

First, initialization conducted at the first step will now be described. In order to analyze the login mechanism of the EIS, the SSO server 102 causes the client 100 to specify a URL of a login page of the EIS (900). Upon accepting the URL input of the login page, the SSO server 102 issues an HTTP GET request to the specified URL as login page retrieval processing 901 (902). Upon receiving the login page request 902, the EIS1 106 generates a login page (903) and returns the login page (904).

Figure 12:
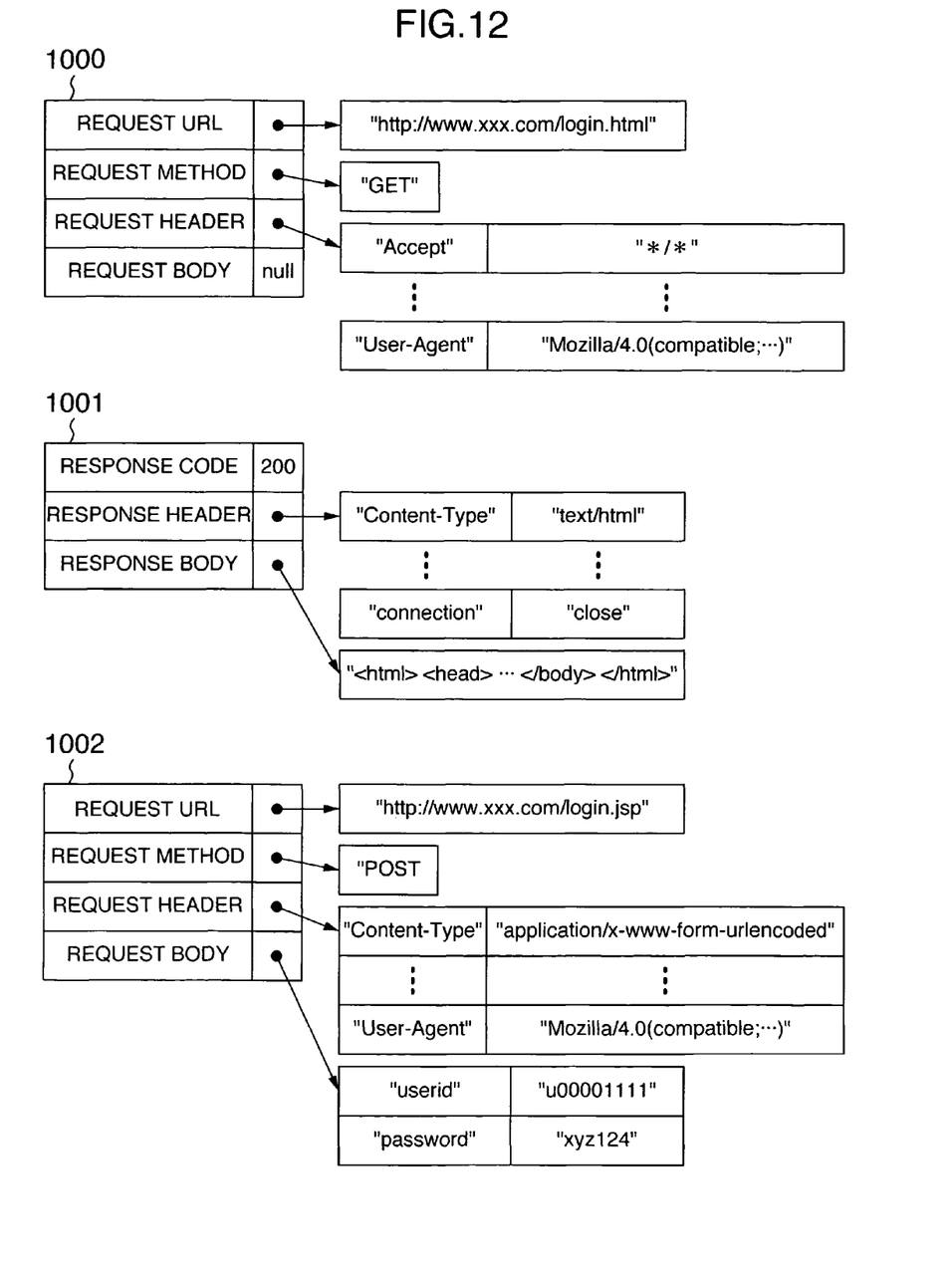
FIG. 12 shows an example of data of an acquired communication log.

The SSO server 102 receives the login page, and records the login page request 902 and login page return 904 as a communication log (905). A communication log corresponding to the login page request 902 becomes as indicated by 1000 in FIG. 12. The communication log for the request becomes a request URL, a request method, a request header and a request body. A communication log corresponding to the response 904 from the EIS1 10 becomes as indicated by 1001 in FIG. 12. The communication log for the response becomes a response code, a response header and a response body.

After recording the communication log, the SSO server 102 rewrites a URL specified in an action attribute of form element for EIS login on a login page 904 returned by the EIS1 106 so as to cause passing through the SSO server 102. Subsequently, the SSO server 102 returns a login screen showing a result of rewriting to the client 100 (907). By the way, in the case of the basic authentication, the present rewriting processing is not conducted. Upon receiving the login screen, the client 100 accepts authentication information input by the user (908). As the authentication information, there are, for example, a user ID and a password. In this way, the authentication information is input and a login request is issued. Since the URL has been changed, the request is transmitted to the SSO server 102 (909). Upon receiving the login request, the SSO server 102 records communication of the login request in the same way as the login page request (910). An example of the communication log is indicated by 1002 in FIG. 12. In the same way as the communication log of the login request, the SSO server 102 records a request URL, a request method, a request header and a request body. After recording the communication log, the SSO server 102 transfers the login request as it is, to the EIS (911). Upon receiving the login request, the EIS conducts authentication (912), and returns an authentication result page (913). Upon receiving the authentication result page, the SSO server 102 records communication in the same way as the foregoing steps (914), and transfers the authentication result page to the client 100 (915).

Figure 13:
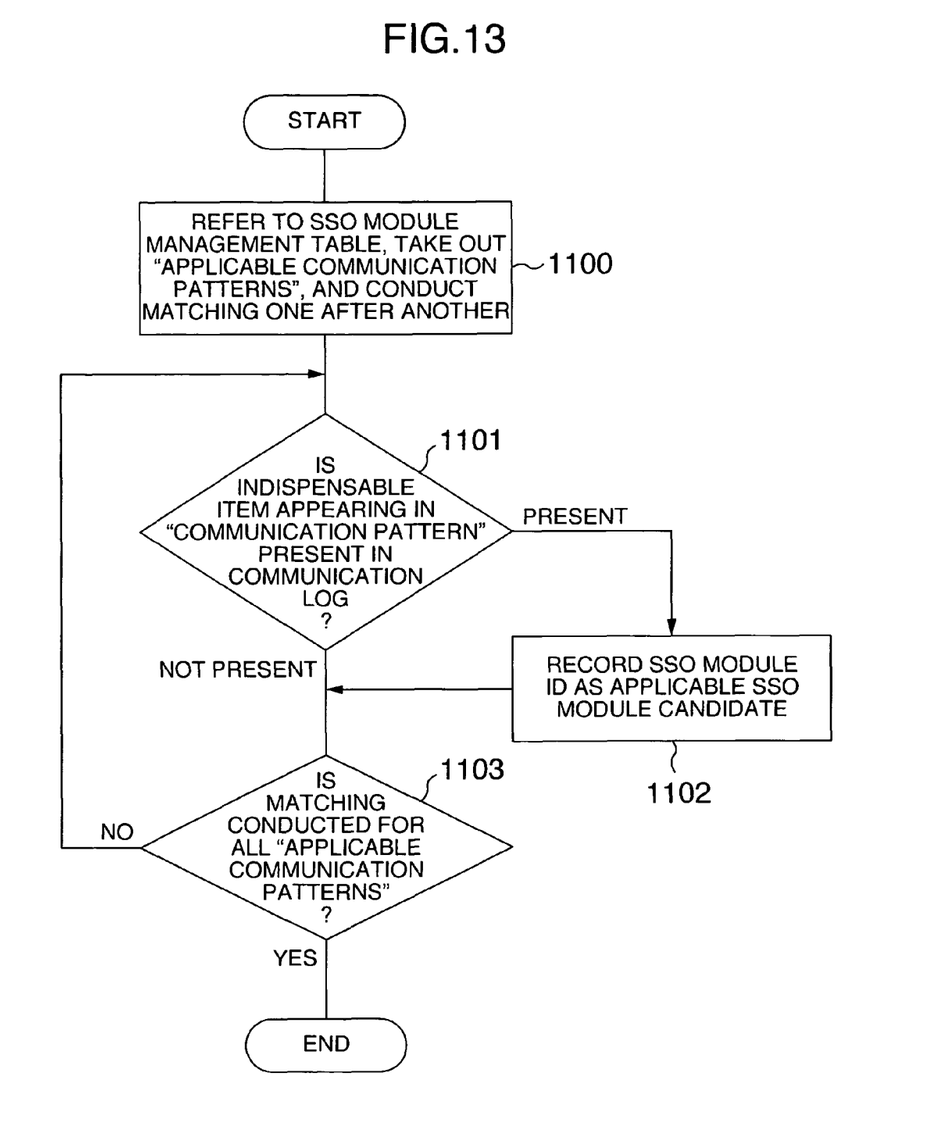
FIG. 13 shows an example of a processing sequence for selecting an applicable single sign-on module on the basis of a communication log and a communication pattern definition.

Processing of selecting SSO module candidates which are applicable to the EIS will now be described with reference to FIG. 13. First, applicable communication patterns 308 in the SSO module management table 105 are taken out, and matching processing is conducted for each of the applicable communication patterns 308. Specifically, it is ascertained whether a header appearing in the applicable communication pattern appears in the communication log shown in FIG. 12 (1101). If the communication log matches the communication pattern, then the SSO module ID is recorded as an applicable SSO module candidate (1102). The present processing is executed for all SSO modules (1103). Applicable SSO modules can be selected by executing the present processing.

Figure 14:
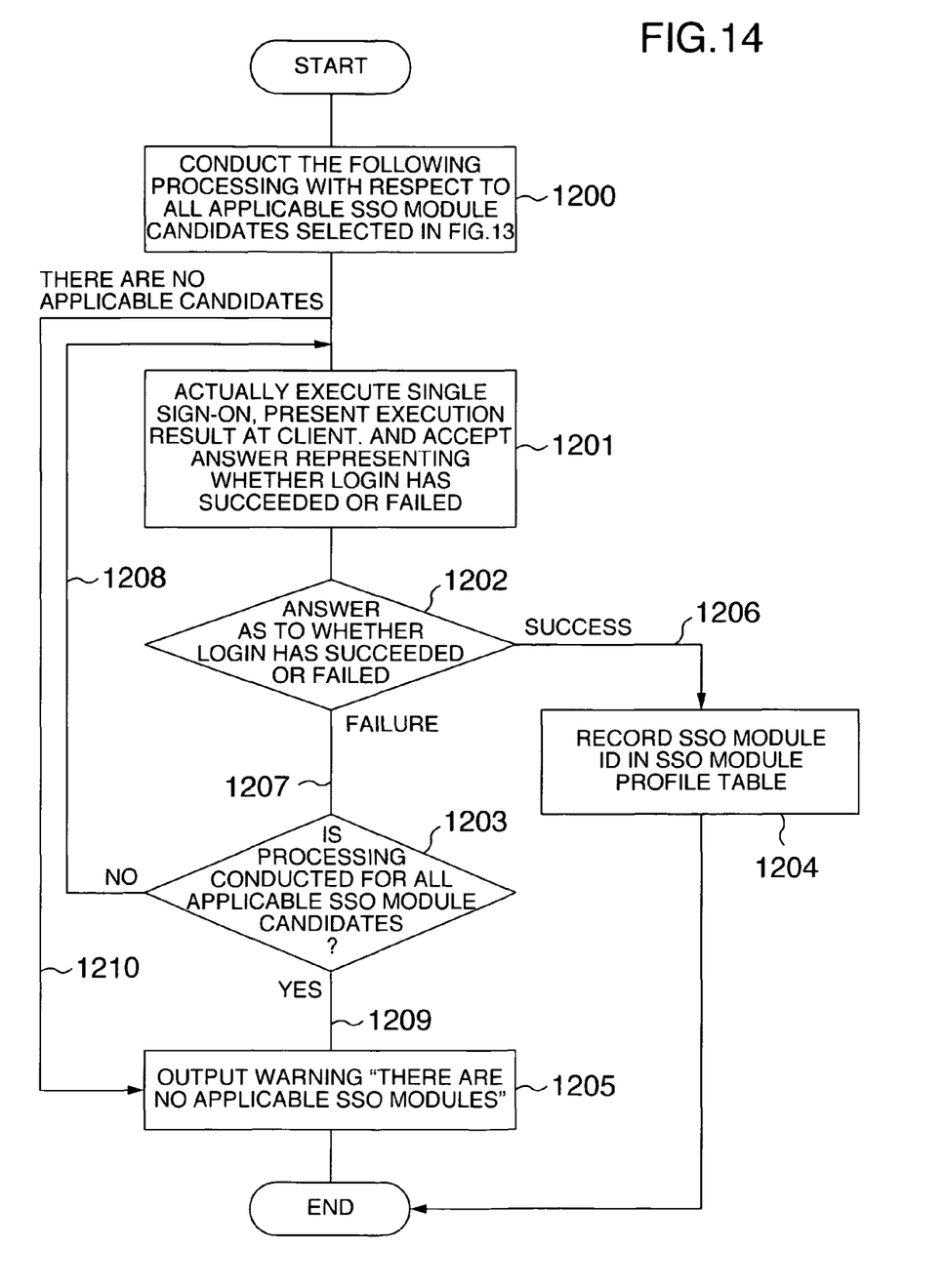
FIG. 14 shows an example of a processing sequence for actually executing an applicable single sign-on module and selecting a single sign-on module to be applied.

Subsequently, a test is conducted to determine whether the SSO module is actually applicable. A concrete processing flow is shown in FIG. 14. The following processing is conducted (1200) with respect to SSO modules recorded (1102) as applicable in FIG. 13. Single sign-on is actually executed using the SSO module, and a single sign-on result screen is presented at the client. And an answer representing whether login has succeeded or failed is accepted (1201). If the login has failed (1207), similar processing is conducted on the next candidate. If the login has succeeded (1206), then an SSO module ID is recorded in the SSO module profile table 504 (1204). If login has failed with respect to all SSO modules or in the first place there are no applicable candidates, then a warning message such as "there are no applicable SSO modules" is output to the client 100 (1205). In this case, it is necessary to develop an SSO module corresponding to the present login mechanism. Prior to the present test, a field name of a user ID and a password to be sent to the EIS by an SSO module as authentication information is set as setting for the SSO module.

Owing to the processing described heretofore, SSO modules corresponding to the backend can be selected. When actually executing the single sign-on, it is conducted as described with reference to FIGS. 8 and 9.

Figure 15:
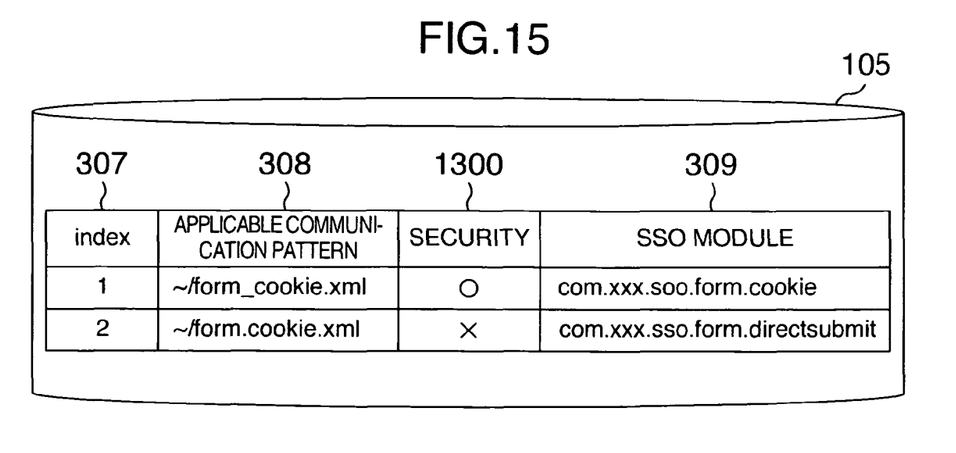
FIG. 15 shows an example obtained by expanding a SSO module management table.

A second embodiment will now be described. If attention is paid to the login mechanism of the EIS, the applicable single sign-on mechanism is not necessarily be single as described in JP-A-2005-321970. As for the single sign-on, a difference appears in the security level and the quantity of computer resources according to the implementation mechanism. In the first embodiment, it is not considered and an SSO module judged to be applicable earliest is selected as in the processing flow shown in FIG. 14. Therefore, attributes of SSO modules are added to the SSO module management table 105 in order to take the attributes of the SSO modules into consideration when deciding an SSO module. Here, an example in which security intensities of the SSO modules are added is shown. In addition to the addition of a table item, transition after the SSO module ID recording processing 1204 in the processing flow shown in FIG. 14 is connected to a stage preceding 1203 instead of being connected to the processing end. As a result, there are a plurality of applicable SSO modules in some cases. If a plurality of SSO modules become applicable, selection is conducted on the basis of attributes of the SSO modules shown in FIG. 15.

A third embodiment will now be described.

In the first and second embodiments, the client, i.e., the user makes a decision whether an applicable SSO module is actually applicable. In order to further automate the success/failure decision, therefore, the decision at the step 1201 shown in FIG. 14 is conducted using the log (914) of the authentication result page in the log acquisition phase and the execution result of the SSO module. As a result, it becomes possible to select an SSO module in a full automatic manner without relying on the user.

A fourth embodiment will now be described. The present embodiment also automates the success/failure decision.

When inputting a URL of a login page in the communication log acquisition phase shown in FIG. 11 (900), a keyword that appears in the case where the login has succeeded is also input together. Subsequently, the decision at the step 1201 in FIG. 14 conducted to make a decision whether login of the SSO module has succeeded is replaced by a decision whether the present keyword is contained in the screen showing a result of execution of the SSO module. As a result, it becomes possible to select an SSO module in a full automatic manner without relying on the user. In the foregoing description, a decision is made whether login has succeeded, by using the keyword that appears in the case where the login has succeeded. On the contrary, it is also possible to cause the user to input a keyword that appears in the case where the login has failed and makes a failure decision.

Heretofore, the embodiments have been described.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A single sign-on implementation method in a distributed system including a plurality of web application servers for respectively providing web applications, web clients for operating the web applications, and a single sign-on server disposed between the web application servers and web clients to provide a single sign-on feature, the single sign-on server comprising a processor, a memory, a plurality of single sign-on modules respectively deployed for implementing single sign-on procedures under respective kinds of authentication and session management, an SSO module management table storing characteristic communication patterns which occur in login operations implemented under each of the kinds of authentication and session management corresponding to each of the single sign-on modules, an SSO module profile table for associating web applications with a single sign-on module to perform single sign-on, and a user information mapping table for storing user IDs and passwords of respective web applications corresponding to user IDs in the single sign-on server, where the processor executes the single sign-on modules and the memory stores the SSO module management table and the SSO module profile table, the single sign-on implementation method comprising the steps of:

(1) causing the single sign-on server to acquire a communication log of login operation for a web application server;

(2) causing the single sign-on server to extract applicable single sign-on module candidates from the single sign-on modules by a pattern matching process checking whether each of the characteristic communication patterns registered in the SSO module management table is contained in the communication log acquired at the step (1);

(3) causing the single sign-on server to actually attempt single sign-on by using each of the applicable single sign-on module candidates extracted at the step (2);

(4) causing the single sign-on server to present a result of execution of the step (3) to a client and receive a decision as to whether the single sign-on has succeeded;

(5) causing the single sign-on server, if a plurality of SSO modules become applicable, to select an SSO module on the basis of said attributes of said SSO modules;

(6) causing the single sign-on server to set the single sign-on module decided to be successful in single sign-on acquired at the step (5), in the SSO module profile table;

(7) causing the single sign-on server to accept a single sign-on request from a client;

(8) causing the single sign-on server to acquire an applicable single sign-on mechanism from the SSO module profile table and request the single sign-on module to execute single sign-on; and (9) causing the single sign-on module to acquire a necessary user ID and a necessary password from the user information mapping table and execute single sign-on, wherein the SSO module management table stores attributes of SSO modules, wherein said attributes of said SSO modules stored in said SSO module management table include security intensities, and in said step of causing the single sign-on server to select an SSO module on the basis of said attributes of said SSO modules, an SSO module is selected on the basis of said attributes of said SSO modules including said security intensities.

2. A single sign-on implementation method according to claim 1, wherein matching with the login result screen acquired in the communication log acquisition phase at the step (1) is substituted for the single sign-on success/failure decision at the step (4).

3. A single sign-on implementation method according to claim 1, wherein the single sign-on success decision at the step (4) is conducted using a specific keyword in HTML.

4. A single sign-on implementation method according to claim 1, wherein the single sign-on failure decision at the step (4) is conducted using a specific keyword in HTML.

* * * * *